(12) United States Patent
Lohmar et al.

(10) Patent No.: US 8,724,535 B2
(45) Date of Patent: May 13, 2014

(54) TECHNIQUE FOR CONTROLLING CONTENT DISTRIBUTIONS IN POINT-TO-MULTIPOINT ENABLED NETWORK ENVIRONMENTS

(75) Inventors: Thorsten Lohmar, Aachen (DE); Gunnar Mildh, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 903 days.

(21) Appl. No.: 12/672,866

(22) PCT Filed: Aug. 9, 2007

(86) PCT No.: PCT/EP2007/007069
§ 371 (c)(1),
(2), (4) Date: Mar. 25, 2010

(87) PCT Pub. No.: WO2009/018848
PCT Pub. Date: Feb. 12, 2009

(65) Prior Publication Data
US 2011/0032858 A1 Feb. 10, 2011

(51) Int. Cl.
*H04H 20/71* (2008.01)
*H04N 7/10* (2006.01)
*H04N 7/20* (2006.01)
*H04W 72/04* (2009.01)
*H04L 12/18* (2006.01)

(52) U.S. Cl.
CPC ......... *H04W 72/0406* (2013.01); *H04L 12/189* (2013.01)
USPC ................................ 370/312; 725/60; 725/73

(58) Field of Classification Search
CPC .......................... H04W 72/0406; H04L 12/189
USPC ........................................................ 370/312
See application file for complete search history.

(56) References Cited

U.S. PATENT DOCUMENTS

| | | | | |
|---|---|---|---|---|
| 7,219,153 | B1* | 5/2007 | Day | 709/229 |
| 8,196,172 | B2* | 6/2012 | Oesterreicher et al. | 725/115 |
| 8,270,345 | B2* | 9/2012 | Franceschini et al. | 370/328 |
| 2002/0026512 | A1* | 2/2002 | Nishimura et al. | 709/226 |
| 2006/0030342 | A1* | 2/2006 | Hwang et al. | 455/466 |
| 2009/0293093 | A1* | 11/2009 | Igarashi | 725/115 |
| 2010/0214966 | A1* | 8/2010 | Hu et al. | 370/311 |

* cited by examiner

*Primary Examiner* — Guang Li

(57) ABSTRACT

The invention relates to a technique for controlling a content distribution in a point-to-multipoint ("PTM")-enabled network environment (100), wherein, over a PTM control channel "CCH" (120, 122), control information related to the content distribution is provided for recipients (112, 114, 116) of the content distribution. The control information is provided over the CCH according to a notification scheme indicating a temporal pattern for the provision of the control information. A method embodiment of the technique comprises the step adopting, for a content distribution, either a first control information notification scheme provided for a distribution of streaming content or a second control information notification scheme provided for a distribution of one or more content files.

18 Claims, 5 Drawing Sheets

US 8,724,535 B2

TECHNIQUE FOR CONTROLLING CONTENT DISTRIBUTIONS IN POINT-TO-MULTIPOINT ENABLED NETWORK ENVIRONMENTS

TECHNICAL FIELD

The invention relates to content distributions in broadcast/multicast networks. More specifically, the invention relates to a technique for controlling a content distribution in a point-to-multipoint (PTM)-enabled network environment, wherein control information related to the content distribution is provided over a PTM control channel for recipients of the content distribution.

BACKGROUND

The 3GPP ($3^{rd}$-Generation Partnership Project) has specified broadcast and multicast services for GSM (Global System for Mobile Communications) and UMTS (Universal Mobile Telecommunications System) networks, namely the Multimedia Broadcast and Multicast Service (MBMS) feature. With MBMS, streaming services may be provided. As an example for a streaming service, a mobile TV service may be mentioned, which can be characterized in that content is continuously provided and that a user (sub-scriber) may be interested to join the service at any time.

The MBMS feature is specified, e.g., in the 3GPP TS (Technical Specification) 23.246, TS 25.346 and TS 26.346. MBMS adds a plurality of broadcast/multicast-related techniques to conventional GSM or UMTS networks for the distribution of content such as video, audio or in general multimedia data. Each broadcast/multicast service is related to a particular service area—the geographical area or zone, within which the content can be broadcasted or transmitted.

A so-called broadcast/multicast service centre (BM-SC) is defined in the Technical Specifications as dedicated MBMS control node. Within the MBMS framework, the BM-SC is responsible for providing and delivering broadcast/multicast services. The BM-SC serves as an entry point for content-delivery services, sets up and controls MBMS transport bearers, and may additionally be used to initiate MBMS content transmissions.

Downstream of the BM-SC, the MBMS content is forwarded along a hierarchically organized content distribution tree, wherein the radio access nodes serving a single radio cell form the leaves of the tree. In an UMTS access network, the Radio Network Controllers (RNCs) or Node Bs (or 'evolved Node Bs' in an LTE network) act as further control nodes for the content distribution. For example, these nodes determine whether to set up a PTM bearer, a point-to-point (PTP) bearer, or no radio bearer at all for the content distribution in response to some feedback received from user terminals.

In MBMS, a control channel termed multimedia control channel (MCCH) is provided for broadcasting control information into the service area. The control information comprises critical and non-critical information. Generally speaking, critical information informs the potential recipients of the content distribution on, for example, when and how to receive a content distribution provided on an MBMS traffic channel (MTCH). Thus the critical information comprises service information and radio bearer information (i.e., for example, a service identifier, multicast addresses and time of transmission, but also media descriptions).

Non-critical information provided in the MCCH may include counting request information. A counting request asks the recipients to indicate to the network if they are interested in a reception of a content distribution. The counting procedure allows the RNC/Node B to decide upon the type of radio transmission bearer to be allocated (PTM bearer, PTP bearer or no bearer).

The MCCH information is transmitted based on a particular schedule related to the actual content distribution. Typically, control information about forthcoming content distributions is continuously provided in the MCCH during a time span extending from a certain point in time before the content distribution until the end of the distribution (more precisely, the end of the last session). This allows a user to join a particular service at any time. For example, control information is provided on the MCCH beginning from a Service Announcement provided by the BM-SC until after the stop of the last session (cf. TS 23.246, FIG. 5).

So-called file delivery services are similar to streaming services in some respect. An example for a file delivery (or 'file download') service is a Podcast service. A Podcast service typically comprises three steps. In a first step, the user is required to subscribe to the Podcast service (this may also be a mandatory step for any other service). For example, the user might subscribe to a TV series, an audio book, a radio program, a compilation of music songs etc. In a second step, data items (i.e. files) are delivered to the user terminal of the user, whereby typically each file is delivered independently from the others. For example, the user may have subscribed for a weekly TV show. Then, each week a content file representing the particular TV show of this week is downloaded (pushed) to the user terminal as soon as the file is available. A preferred delivery time (download time) may be overnight. The delivered content file is stored in the user terminal. Eventually, in the third step the user may consume the stored content file at any time he or she prefers. Thus, while a file download service such as a Podcast service is similar to a streaming service in that one and the same content is to be distributed to many users (subscribers), there is a difference in the intended usage of the content: While a TV subscriber may join a service at any time and consumes the streaming content essentially immediately, a Podcast subscriber is interested in obtaining the content file to be provided for download in its entirety but will consume it at a later time.

Irrespective of whether the content distribution comprises a streaming service or a file delivery service, in MBMS the MCCH resources for announcing the content distribution and for providing related control information are allocated before and during the entire content distribution. The MCCH has a limited transmission capacity, such that only a limited number of services can simultaneously be announced. In a typical MBMS-enabled network, 20 to 30 MBMS bearers can be announced in parallel.

SUMMARY

There is a need for a technique of controlling content distributions in a PTM-enabled network environment which allows to efficiently provide different content distributions schemes such as a scheme for a distribution of streaming content and a scheme for a distribution of content files.

According to a first aspect, a method for controlling a content distribution in a point-to-multipoint (PTM)-enabled network environment is proposed. Over a PTM control channel "CCH" (120, 122), control information related to the content distribution is provided for recipients (112, 114, 116) of the content distribution, and the control information is provided over the CCH according to a notification scheme indicating a temporal pattern for the provision of the control information. The method comprises the steps of receiving information related to the content distribution; adopting, based on the information and for the content distribution, either a first control information notification scheme provided for a distribution of streaming content or a second control information notification scheme provided for a distribution of a content file; and initiating a transmission of control information in accordance with the adopted notification scheme on the CCH.

In one implementation of this aspect, the PTM-enabled network may be an UMTS or UMTS Long Term Evolution (LTE) network with MBMS providing broadcast and/or multicast services to items of user equipment (UEs) as recipients. The CCH may provide, as control information, at least one of service information, radio bearer information and access information. For example, the CCH may be the MCCH specified in the TS 25.346. In one variant of this implementation, the information related to the specific content distribution may be received in an MBMS Session Start message. In further variants, this information may be embedded in another MBMS message such as a Service Announcement message. In still further variants, the information used to adopt a particular notification scheme is received in more than of the above-mentioned or further messages.

A content file may comprise multimedia data such as audio data, image or video data, or a combination thereof. A content file may also comprise one or more messages, for instance in case the content distribution is related to the distribution of one or more messages in a messaging system.

A content file may comprise one or more (sub-)files. Additionally or alternatively, the second notification scheme may also be applied for a distribution of multiple content files, such as a sequence of files. The sequence files may be provided successively for a continuous download of all files. Or there may be a time gap between at least two of the files; for example, every 1000 seconds, there is provided one of the files from the sequence of files. The time gap could have any length, e.g. several 1000 seconds, one day, or several days.

A streaming service may, for example, be characterized in that content (streaming) data are intended for immediate perception. The content data provided in a continuous fashion may therefore be temporarily buffered in a 'small' buffer in a recipient device. A 'small' buffer may, e.g., comprise a buffer adapted to buffer only one or few image frames of a video stream representing one or few seconds or only a fraction of a second of the video. A file download (file delivery) service, on the other hand, may be characterized in that one or more content files are downloaded to the recipient's device for later perception. Therefore, the downloaded file has to be stored for a longer time period in a storage space dimensioned for storage of the entire download file.

According to one implementation, the first notification scheme is employed for at least one of Mobile TV services and mobile radio services. The mobile radio services may include, for example, IP (Internet Protocol)-based radio services and/or one or more Push-To-Talk services. The second notification scheme may be employed for at least one of Podcast services, newsticker services and feed services such as newsfeed services in the PTM-enabled network environment.

The step of adopting the notification scheme may comprise selecting the notification scheme from a predefined plurality of notification schemes comprising at least the first and the second notification scheme. For example, a third notification scheme may be provided for distributing high-priority messages to recipients, such as emergency messages. Alternatively or additionally, at least one of the notification schemes may comprise sub-schemes; for example, the second notification scheme for the distribution of content files may comprise a sub-scheme for the distribution of messages, e.g., emergency messages.

In case various (sub-)schemes are provided for file download, these schemes may take into account further service characteristics, which may, e.g., be of a more technical nature or user-related. For example, different schemes may be provided dependent on the number of files to be downloaded at a time or within a time span (i.e., the content distribution comprises several downloads).

According to a second aspect, a further method for controlling a content distribution in a PTM-enabled network environment is proposed, wherein the method is based on the same premises as in the first aspect. The method comprises the steps of establishing a first control information notification scheme for the distribution of streaming content; establishing a second control information notification scheme for the distribution of one or more content files; determining information related to the content distribution; and sending the information related to the content distribution to enable adopting a proper one of the control information notification schemes for the specific content distribution.

The first and second notification schemes may be established by providing prescriptions stored with or without association to services as provided by the PTM-enabled network. The information may be determined based on service characteristics or may be received from another point in the network, for example may be manually provided via an operator's terminal by an operator. The information may be sent within a message such as the above-mentioned MBMS message(s).

In one example, the method according to the first aspect is performed in a control node in a radio network part of the PTM-enabled network, for example an RNC or evolved Node B (eNB) of an UMTS or LTE network. The method according to the second aspect may be performed in a control node of another part of the network, for example a BM-SC. In another example, both the methods according to the first and second aspect are performed within one node of the network, e.g. in a BM-SC of an UMTS network, which may then perform both the determination of an appropriate notification scheme and its adoption for a particular content distribution.

Each of the variants and examples discussed in the following may relate to one or both of the first and the second aspect described above.

The information related to the specific content distribution may comprise an indication of the notification scheme to be selected. For instance, the schemes with its temporal patterns and the associated indications may be predefined and associated with certain (e.g., numerical) indicators.

The information related to the specific content distribution may specify at least partly the temporal pattern of the notification scheme to be adopted. For example, one or more mandatory time intervals for announcing the control information may be explicitly prescribed in the information.

The information related to the specific content distribution may comprise information related to at least one of a resource allocation for the content distribution and a time point for the start of the content distribution. For example, the information related to the specific content distribution may comprise or may be embedded in an MBMS Session Start message or any other MBMS message related to the provision of an MBMS service.

In one variant, the temporal pattern of the first notification scheme comprises continuously providing the control information over the CCH within a time span before and during the content distribution. In an MBMS system of an LTE network, the time span at an RNC or eNB may begin after the reception of a Session Start message. The time span may stop with the reception of a session stop.

In another variant, which may or may not be combined with the before-discussed variant, the temporal pattern of the second notification scheme comprises discontinuously providing the control information over the CCH in a time span before and during the content distribution, for instance, only in at least one time interval within the time span. The time interval may be considerably shorter than the time span of the content distribution, and may, e.g., only cover a starting phase of the distribution. In one mode, the temporal pattern comprises two or more time intervals being separated by at least one time gap. In an additional or alternative mode, the temporal pattern comprises periodic time intervals. For example, the control information may be announced on the CCH every 5 minutes.

The second notification scheme may comprise mandatory and/or optional time intervals for providing the control information on the CCH. In one variant, the provision of control information on the CCH is triggered by a stop of another PTM content distribution. This stop might be relevant in case a user is subscribed to both PTM services. If the user has a terminal capable of receiving a single transmission only, the user cannot receive both services and therefore might be interested in being informed of the (possibly already ongoing) content distribution. Similarly and for similar reasons, the provision of control information on the CCH may be triggered by a stop of a point-to-point (PTP)-connection in the network environment.

In one example, the information related to the specific content distribution indicates a particular distribution scheme according to which the content is distributed. For example, the information related to the specific content distribution may comprise an indication of one from a plurality of distribution time schemes comprising a continuous distribution time scheme for continuous content distributions and a discontinuous distribution time scheme for discontinuous content distributions. In one mode, a first distribution time scheme is provided for a distribution of streaming content and a second distribution time scheme is provided for a distribution of one or more content files, e.g. file downloads. In one realization of this mode, the second control information notification scheme is selected for the discontinuous distribution time scheme.

A part of the control information related to a content distribution may be provided according to one of the notification schemes, while another part is provided according to the other or another notification scheme(s). For example, the control information provided on the CCH may comprise a request to the recipients for indicating if they are interested in a reception of the content distribution. For example in an MBMS system, the MCCH may transport non-critical information such as Counting information (cf. TS 25.346). This information may be provided using the second notification scheme, whereas all or part of the critical information may be provided using the first notification scheme in one realization of this mode.

Multiple of the notification schemes may be adopted and a first and second of the adopted notification schemes may be applied to a first and second portion of the control information provided over the CCH, respectively. For a content file distribution within the framework of an MBMS service, for example, only the non-critical control information may be provided according to the notification scheme for the file distribution, whereas the critical information is provided according to the notification scheme for the distribution of streaming content (e.g., continuous announcement of the critical information on the CCH).

According to a third aspect, a computer program product is provided comprising program code portions for performing the steps of any one of the method aspects described herein when the computer program product is executed on one or more computing devices, for example an RNC, eNB or BM-SC in an UMTS or LTE network. The computer program product may be stored on a computer readable recording medium, such as a permanent or re-writeable memory within or associated with a computing device or a removable CD-ROM or DVD. Additionally or alternatively, the computer program product may be provided for download to a computing device, for example via a data network such as the Internet or a communication line such as a telephone line or wireless link.

According to a fourth aspect, a control node is proposed adapted for controlling a content distribution in a PTM-enabled network environment, wherein, over a PTM control channel "CCH", control information related to the content distribution is provided for recipients of the content distribution, and the control information is provided over the CCH according to a notification scheme indicating a temporal pattern for the provision of the control information. The control node comprises a reception component adapted to receive information related to the content distribution; a control information provisioning component adapted to adopt, based on the information related to the specific content distribution and for the content distribution, either a first control information notification scheme provided for a distribution of streaming content or a second control information notification scheme provided for a distribution of a content file; and a transmission component adapted to initiate a transmission of control information in accordance with the adopted notification scheme on the CCH. The control node may be an RNC or evolved Node B (eNB).

According to a fifth aspect, a control node is proposed which is adapted for controlling a content distribution in a PTM-enabled network environment, wherein, over a PTM control channel "CCH", control information related to the content distribution is provided for recipients of the content distribution, and the control information is provided over the CCH according to a notification scheme indicating a temporal pattern for the provision of the control information. The control node comprises a first provisioning component adapted to establish a first control information notification scheme for the distribution of streaming content; a second provisioning component adapted to establish a second control information notification scheme for the distribution of one or more content files; a determination component adapted to determine information related to the content distribution; and an interface component adapted to send the information related to the content distribution to enable adopting a proper one of the control information notification schemes for the specific content distribution. The control node may be a BM-SC.

According to a sixth aspect, a mobile network is proposed comprising a control node according to the fourth aspect and a control node according to the fifth aspect of the invention.

BRIEF DESCRIPTION OF THE DRAWINGS

In the following, the above-mentioned aspects will further be described with reference to exemplary embodiments illustrated in the figures, in which.

DETAILED DESCRIPTION

In the following description, for purposes of explanation and not limitation, specific details are set forth, such as particular control nodes, communication protocols etc., in order to provide a thorough understanding of the above-mentioned aspects. It will be apparent to one skilled in the art that these aspects may be practised in other embodiments that depart from these specific details. For example, the skilled artisan will appreciate that the aspects may be realized in communications networks different from the UMTS LTE network discussed below. In particular, the aspects may be realized within any network environment enabled for PTM services. This may include for example networks such as wireless network, which have PTM mechanisms such as IP multicast/broadcast transport mechanisms implemented. Whereas in the embodiments below it is described that control procedures are implemented in various separate nodes of a PTM-enabled network environment, PTM control may also be implemented in only one node. Generally, the term 'node' is intended to designate a functional entity, which may be implemented on one or more physical nodes being arranged either locally or remote to each other.

Those skilled in the art will further appreciate that functions explained hereinbelow may be implemented using individual hardware circuitry, using software functioning in conjunction with a general purpose computer or a programmed microprocessor, using an application specific integrated circuit (ASIC) and/or using one or more digital signal processors (DSPs). It will also be appreciated that when an aspect is described as a method, it may also be embodied in a computer processor and a memory coupled to a processor, wherein the memory is encoded with one or more programs that perform the methods disclosed herein when executed by the processor.

Figure 1:
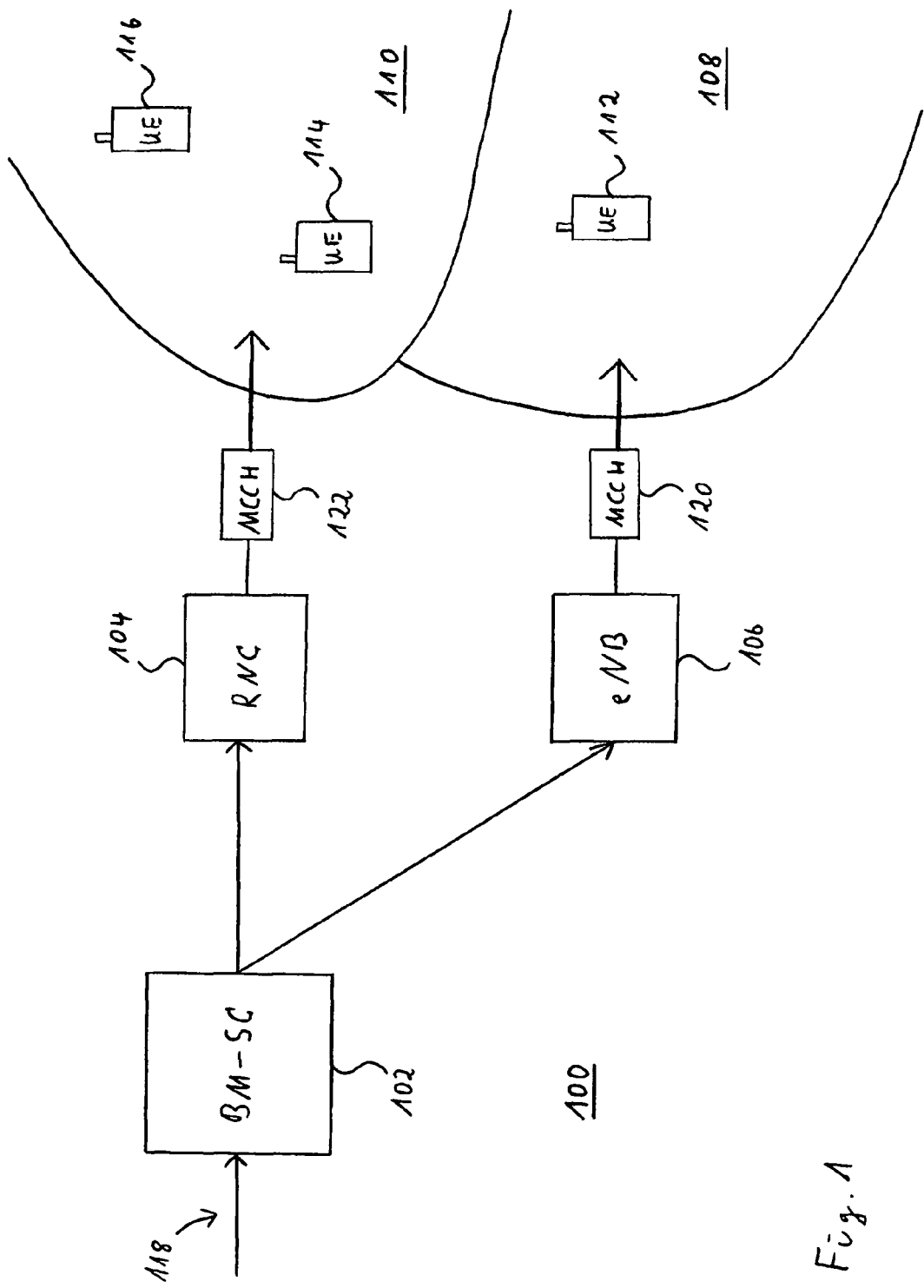
FIG. 1 schematically illustrates an embodiment of a PTM-enabled network environment.

FIG. 1 schematically illustrates an embodiment of a point-to-multipoint (PTM)-enabled network environment which is assumed to be an UMTS Long Term Evolution (LTE) network 100 comprising a broadcast/multicast-service center (BM-SC) 102, a radio network controller (RNC) 104, an evolved Node B (eNB) 106 as well as, in separate radio cells 108 and 110, various items of user equipment (UE) 112, 114 and 116 such as smartphones, PDAs or other mobile devices. Further components of the LTE network 100 such as gateways, signaling control nodes etc. have been omitted in FIG. 1 for clarity. For example, an SGSN, GGSN and/or MBMS-GW may be arranged between the BM-SC 102 and the RNC 104/eNB 106. See the TS 23.246, FIG. 1 or TS 23.402, FIG. 4.2.1-1 as examples for detailed architectural depictions.

It is assumed that the LTE network 100 has implemented a variant of the MBMS feature as specified by the 3GPP and the BM-SC 102, RNC 104 and eNB 106 are configured for controlling, as a concrete embodiment of a PTM service, at least one MBMS service. As indicated by arrow 118, the BM-SC 102 receives content within the framework of the MBMS service. The content may comprise audio/video (AV) data and in general any kind of multimedia data. The BM-SC 102 controls the distribution of the content within the service area of the PTM service, which is assumed to comprise the radio cells 108 and 110. The content may be received by the BM-SC 102 at any time before the content distribution is performed. The provision 118 of the content to the BM-SC may be performed by an automatic, semi-automatic or manual operation, e.g. an administrative action. It is to be noted that the BM-SC 102 is the sender of the content from the point of view of the further entities within the PTM network 100. In which way the content may be provided to the BM-SC is therefore not considered herein any further.

Details of the MBMS functionality implemented in the BM-SC 102, RNC 104 and eNB 106 for providing the MBMS service may be found in the corresponding 3GPP specifications. For instance, details of the control signaling provided to the service area of the MBMS service is described in the TS 25.346. One MBMS control channel (MCCH) 120 and 122 provides control information for recipients in the cells 108 and 110, respectively. For example, an MBMS Service Announcement may be provided indicating to potential recipients the forthcoming distribution of content related to the MBMS service. MBMS Session Start messages may afterwards indicate the establishment of bearer resources downstream of the BM-SC 102 for the actual content distribution. MBMS Notification messages may provide further data about a forthcoming/ongoing data transfer.

Control information related to a particular content distribution is provided by the MCCHs 120 and 122 in a time span from a certain point in time before the actual start of the distribution to the recipients 112-116 and until a point in time related to the end of the distribution. At least two notifications schemes corresponding to a particular temporal pattern of providing the control information into the service area are implemented for the MCCH 120 and 122. A particular one of the notification schemes may be employed for a service by the RNC 104 on the basis of a type of content distribution provided by the service. The similar holds for the eNB 106. This will be described in more detail further below. The first of the control information notification schemes is provided for a distribution of streaming content such as AV (Audio/Video) streaming as required, for example, for mobile TV services. The second of the control information notification schemes is provided for a distribution of one or more content files, for instance for Podcast services. It is noted that on-demand streaming may typically be offered as a PTP service and will therefore not be discussed herein, although in principle also on-demand streaming PTM services may be offered. However, for such services the considerations related to PTM push services as given herein may be applied accordingly.

Figure 2:
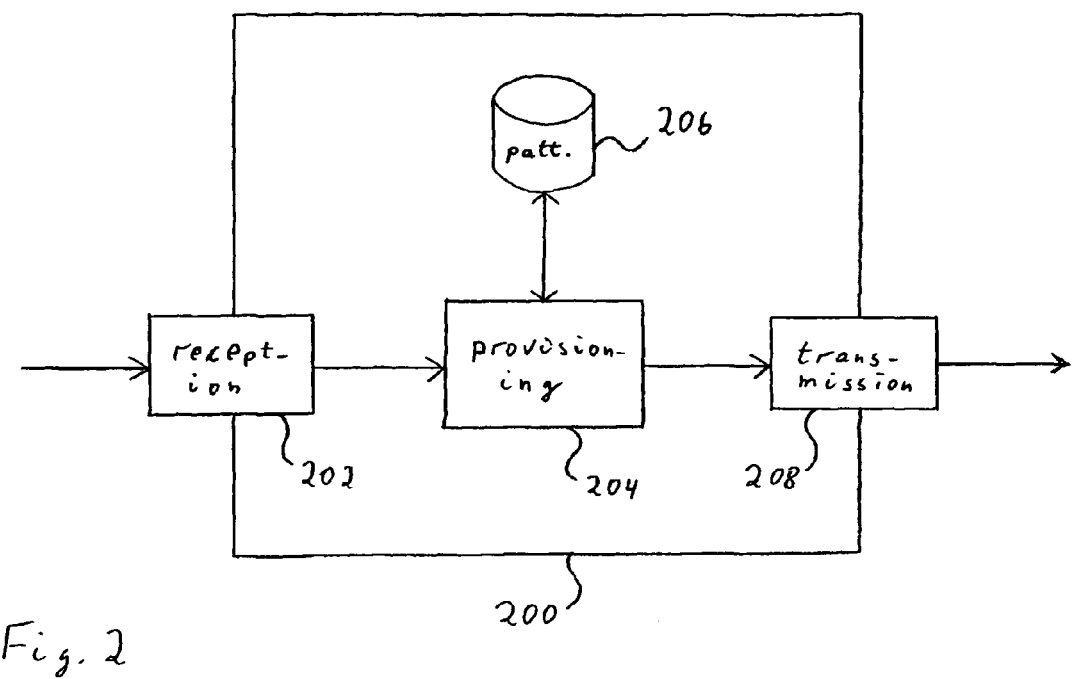
FIG. 2 schematically illustrates a first embodiment of a control node in a PTM-enabled environment.

FIG. 2 illustrates functional components of an embodiment of a control node 200 adapted for controlling a content distribution in a PTM-enabled network environment such as the UMTS network 100 of FIG. 1. The control node 200 may, for example, be an implementation of either one of the RNC 104 and eNB 106 from FIG. 1.

The control node 200 comprises a reception component 202, which is adapted to receive information related to the content distribution. For example, the component 202 may be adapted to receive an indication of a particular one of two notification schemes for streaming content and file delivery, respectively, from a BM-SC such as the BM-SC 102 from FIG. 1. The indication may be provided associated with further control information related to a particular service. For example, the indication may be embedded within an MBMS Session Start message for a service. Alternatively, the indication of a notification scheme for one or more services (or particular content distributions) may also be provided in an extra control message which is not related to a start of a service.

The control node 200 further comprises a control information provisioning component 204, which is adapted to adopt, based on the information related to the specific content distribution and for the content distribution, either a first control information notification scheme provided for a distribution of streaming content or a second control information notification scheme provided for a distribution of one or more content files. Temporal patterns for the at least two notification schemes may be stored, for example, in a storage component 206. Taking the above example further, the provisioning component 204 may access the component 206 to retrieve the temporal pattern according to the indication forwarded from the reception component 202.

Then, the provisioning component 204 may operate to provide control information according to the temporal pattern associated with the indicated notification scheme. The provisioning component 204 may further adapt the temporal pattern of the indicated notification scheme according to the recipients in the cell served by the control node 200. For example in case of a multicast service, if no subscribed user of the service is located within the served cell, the provisioning component 204 may decide to omit the provisioning of control information over the control channel even if such a provisioning would have to be scheduled according to the active temporal pattern.

The control node 200 further comprises a transmission component 208, which is adapted to initiate a transmission of the control information in accordance with the adopted notification scheme on the control channel, e.g. the MCCH 120 or 122 illustrated in FIG. 1.

Figure 3:
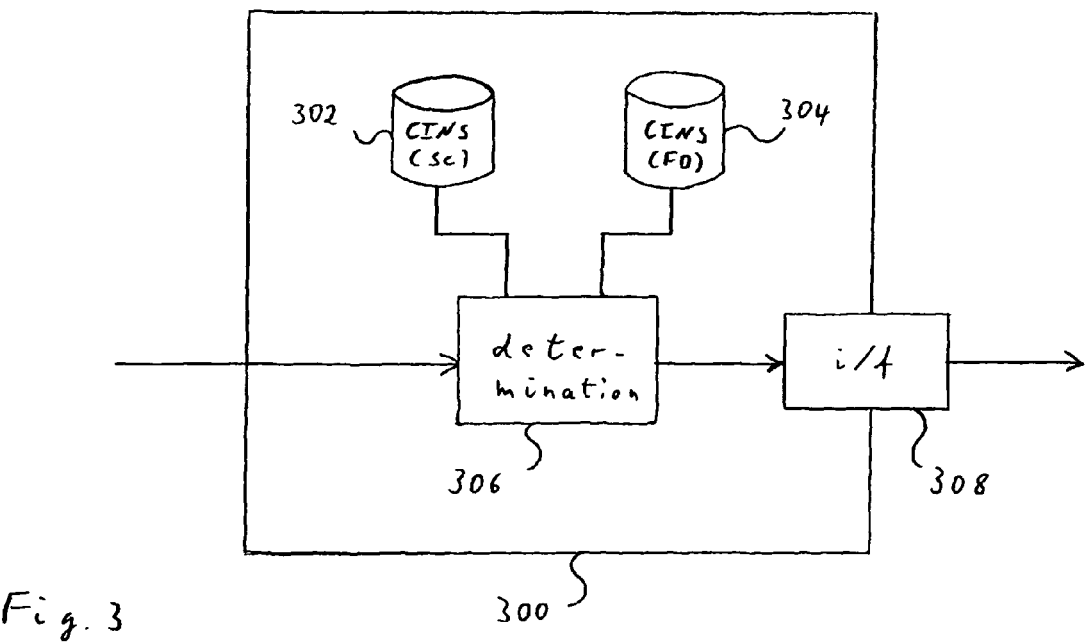
FIG. 3 schematically illustrates a second embodiment of a control node in a PTM-enabled environment.

FIG. 3 illustrates functional components of a further embodiment of a control node 300 adapted for controlling a content distribution in a PTM-enabled network environment. The control node 300 may for example be an implementation of the BM-SC 102 of FIG. 1.

The control node 300 comprises a first provisioning component 302 adapted to establish a first control information notification scheme (CINS) for the distribution of streaming content (SC). The control node 300 further comprises a second provisioning component 304 adapted to establish a second control information notification scheme for the distribution of one or more content files, i.e. the provisioning of a file download (FD) service. The components 302 and 304 may be storage components.

The CINS for SC and FD, respectively, may specify a temporal pattern for the provisioning of control information in a control channel such as the MCCHs 120 and 122 for a particular service or for a plurality of services. For example, a CINS may specify the temporal pattern in absolute times, time points in a daily, weekly or otherwise regular fashion, or may specify the temporal pattern relative to a control mechanism for announcing the control information in the control channel. For example, the temporal pattern may be defined relative to an MBMS Session Start message to be sent for the respective service. The CINS in the components 302 and 304 may for example have been configured manually by an operator or in any other way.

As a concrete example, the first CINS for the SC may prescribe a continuous provision of control information from after a Session Start to until a Session Stop in an MBMS service. On the other hand, the second CINS for the FD may prescribe a more complex provisioning temporal pattern which comprises, for example, a short time interval after an MBMSSession Start, within which control information is provided. Additionally, one or more optional time intervals may be available between Session Start and Session Stop, which are placed dependent on predetermined triggering events related or not related to the corresponding service. For instance, such triggering events may comprise the stop of another session of another service provided by a network, to which node 300 belongs, and/or the stop of a PTP service for a user.

The control node 300 further comprises a determination component 306 adapted to determine information related to the content distribution. The information may be constructed to enable adopting, for the specific content distribution, a proper one of the available control information notification schemes (SC and FD). For example, the determination component 306 may receive from a content server (not shown) information related to the type of content to be provided, e.g. whether the content comprises continuous streaming data or one or more files to be pushed to the recipients. The determination component may use this information to determine which CINS to apply for the content distribution. Alternatively, a "content ready" information may be received from a content server, the information comprising an explicit indication of a CINS to be apply. The determination component may in this case forward the indication to downstream control nodes such as the node 200 from FIG. 2, or may access the provisioning components 302 and 304 to convert the received CINS indication into the proper network-dependent CINS indication and forward the latter to the downstream nodes.

The control node 300 further comprises an interface (i/f) component 308 adapted to send the information related to the specific content distribution downstream in the direction towards the recipients of the content. As an example, the determination component 306 may construct an MBMS Session Start message including an indication of either the CINS for streaming content or the CINS for a file download. As an example, either "file" or "streaming" may be indicated. This message may then be provided by the interface component 308 to radio network control nodes such as the RNC 104 or eNB 106 in FIG. 1.

Figure 4:
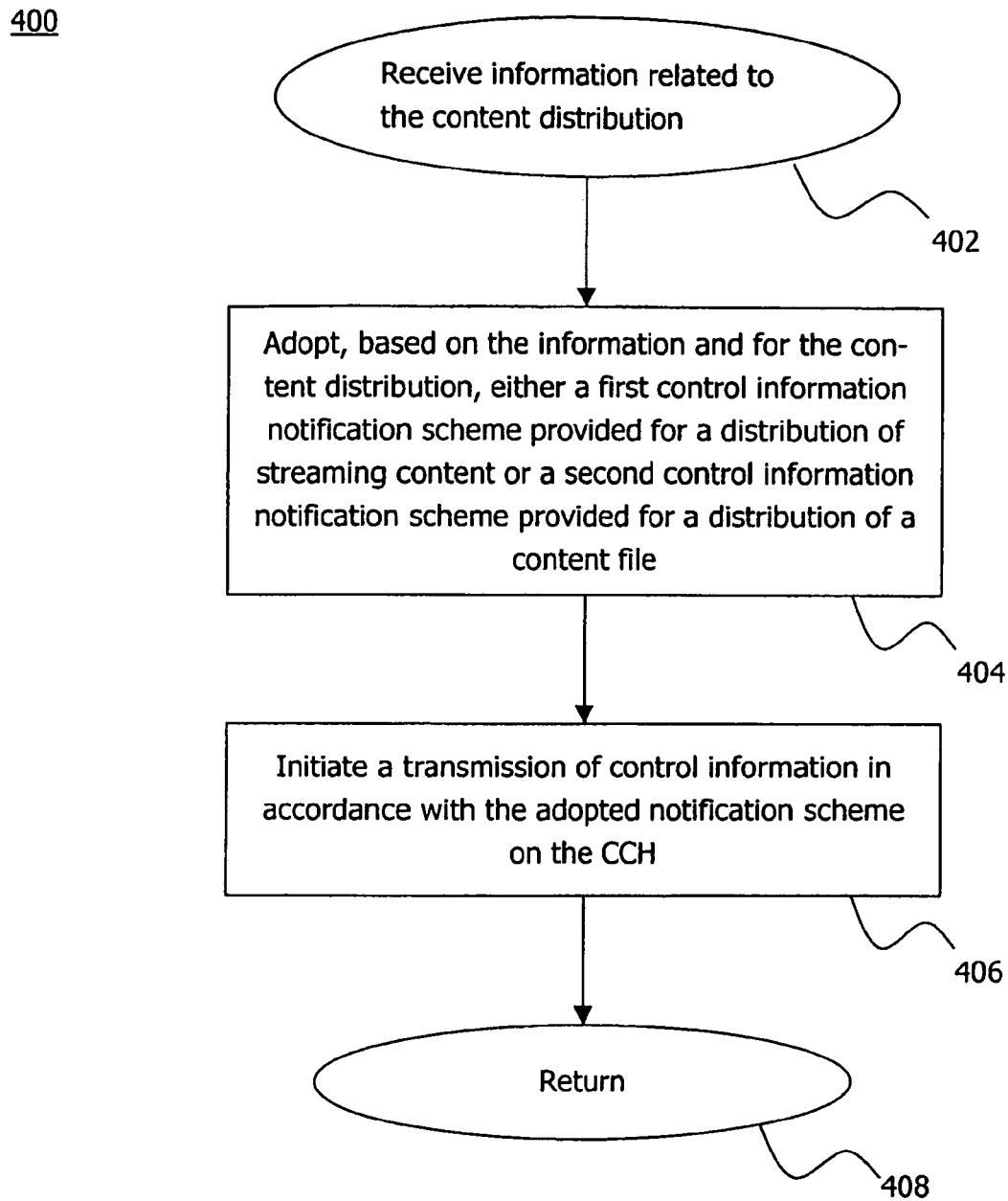
FIG. 4 is a flow diagram illustrating a first embodiment of a method for controlling a content distribution in a PTM-enabled network environment.

FIG. 4 is a flow diagram illustrating steps of an embodiment of a method 400 for controlling a content distribution in a PTM-enabled network environment. Over a PTM control channel "CCH", such as the MCCH illustrated in FIG. 1, control information related to the content distribution is provided for recipients of the content distribution, and the control information is provided over the CCH according to a notification scheme indicating a temporal pattern for the provision of the control information. The method 400 may be performed, for example, in the control node 200 of FIG. 2.

The method starts in step 402 with the reception of information related to a specific content distribution. In the case, where method 400 is performed in a radio network control node such as the RNC 104 or eNB 106 of FIG. 1, the received information may be, e.g., an MBMS Session Start message or a similar message informing about the availability of a service and/or a forthcoming content distribution.

In step 404, based on the information related to the specific content distribution and for the content distribution, either a first control information notification scheme provided for a distribution of streaming content or a second control information notification scheme provided for a distribution of one or more content files is adopted. For example, the notification scheme may be adopted based on an indication of one of the schemes, the indication being included in the received information. Alternatively, one of the notification schemes may have been specified explicitly, i.e. including a temporal pattern, within the received information.

In step 406, a transmission of control information in accordance with the adopted notification scheme is initiated on the CCH, which may for example be the MCCH 120 or 122 of FIG. 1. In step 408, the method 400 returns control to a higher layer control program for controlling content distributions.

Figure 5:
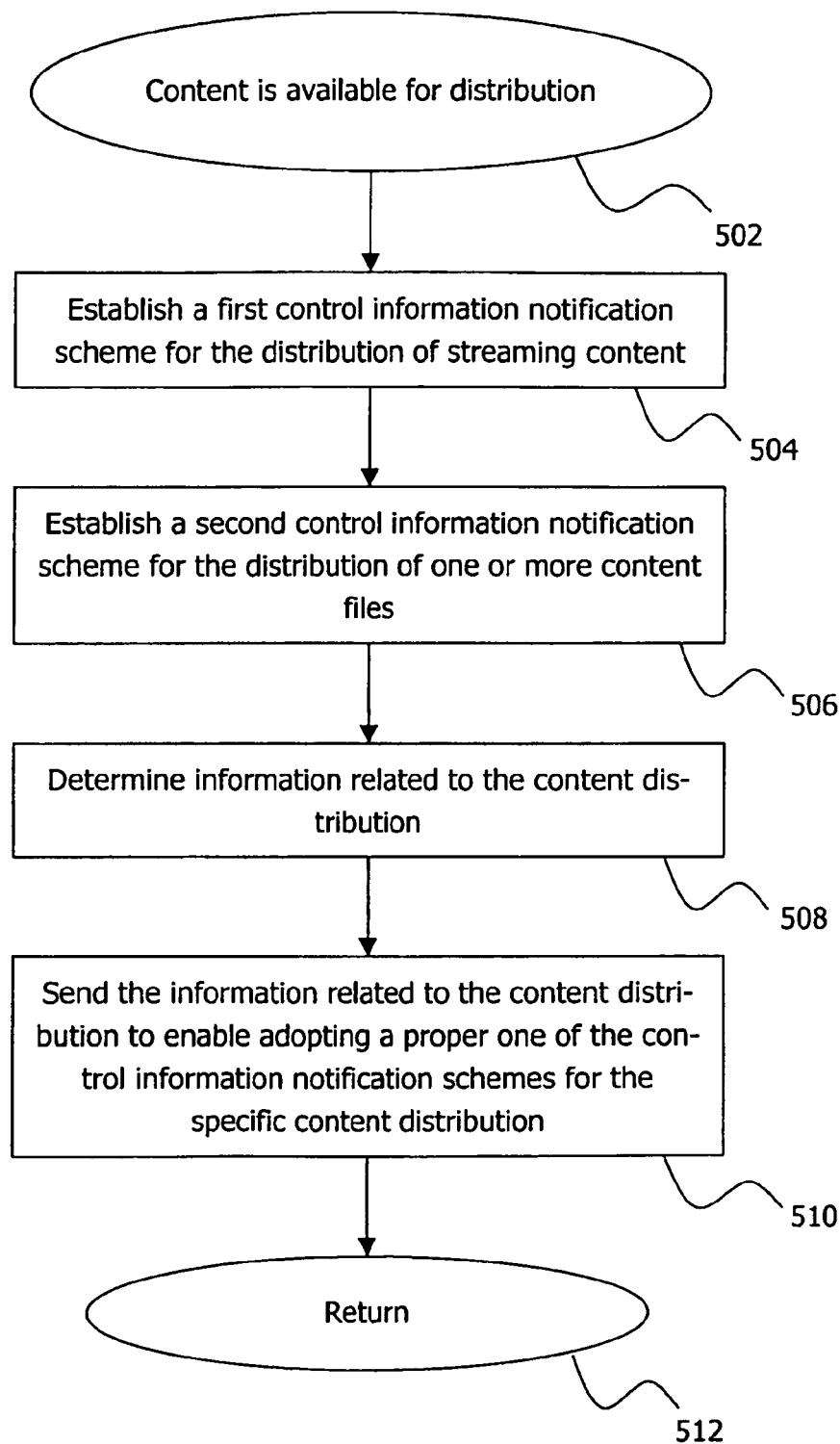
FIG. 5 is flow diagram illustrating a second embodiment of a method for controlling a content distribution in a PTM-enabled network environment.

FIG. 5 is a flow diagram illustrating steps of a further embodiment of a method 500 for controlling a content distribution in a PTM-enabled network environment, wherein, over a PTM control channel "CCH", control information related to the content distribution is provided for recipients of the content distribution, and the control information is provided over the CCH according to a notification scheme indicating a temporal pattern for the provision of the control information. The method 500 may be performed, for example, in the control node 300 of FIG. 3.

The method may be triggered in step 502 by the availability of content for distribution or by the announcement that such content will be available at a particular point in time. In step 504, a first control information notification scheme for the distribution of streaming content is established. In step 506, a second control information notification scheme for the distribution of one or more content files is established. In step 508, information related to the content distribution is determined. For example, an MBMS Session Start message may be constructed, which includes an indication of one of the first or second notification scheme. In step 510, the information related to the content distribution is sent to enable adopting a proper one of the control information notification schemes for the specific content distribution.

The method 500 terminates with step 512 by returning control to a higher control program for controlling the content distribution.

It is to be noted that method 400 of FIG. 4 and method 500 of FIG. 5 may be performed within one and the same control node, e.g. a BM-SC, or in a radio network control node such as an RNC, Node B or eNB. In this case, for example the step 510 of sending information related to a particular content distribution and the step 402 of receiving such information comprises providing the information from one internal component of the node to another internal component.

Figure 6:
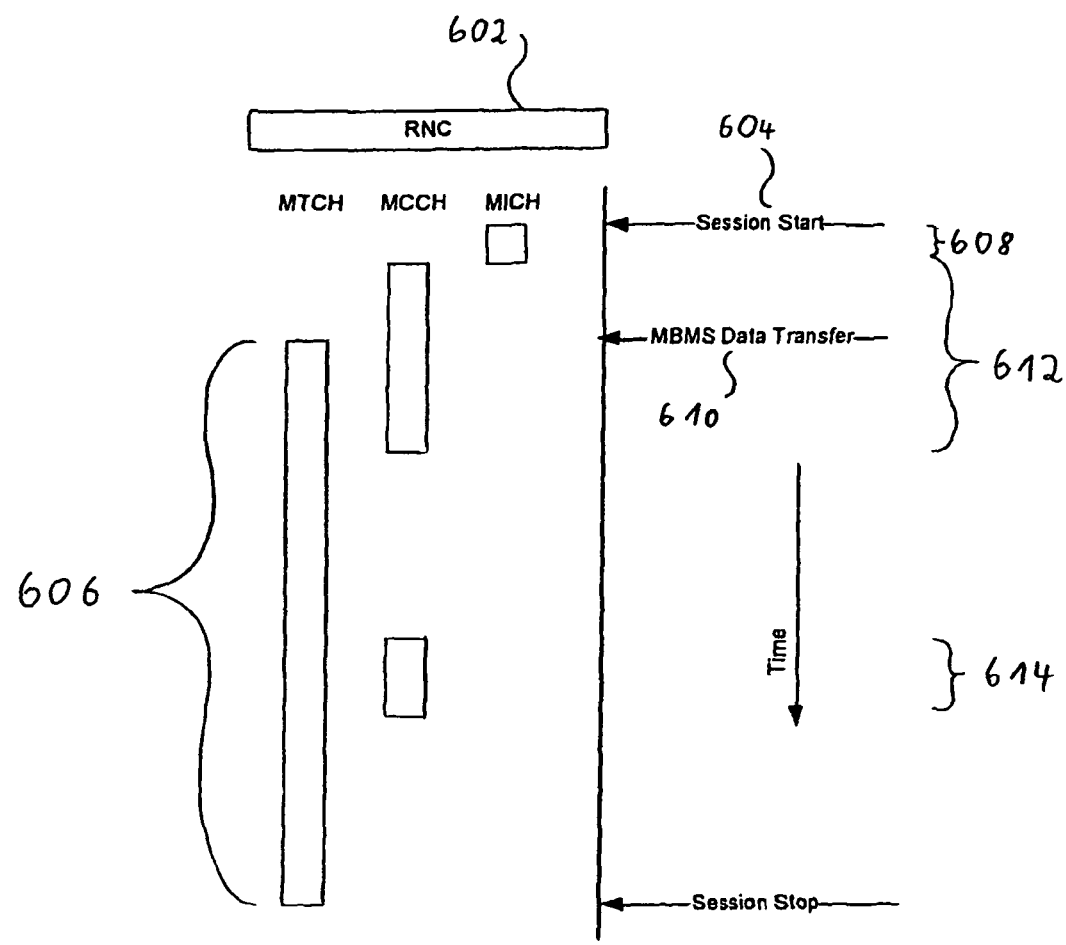
FIG. 6 schematically illustrates a temporal pattern of a notification scheme for providing control information in a PTM-enabled network environment.

FIG. 6 illustrates an embodiment of a temporal pattern 600 of a control information notification scheme for a file delivery service in an MBMS system. An RNC 602, which may be for example the RNC 104 of FIG. 1 or a representation of the control node 200 of FIG. 2, receives an MBMS Session Start message 604. The message 604 triggers the allocation of transmission resources for a content distribution 606 in the RNC 604. The actual content distribution 606 will be performed within an MBMS traffic channel MTCH. Control information related to the content distribution 606 is announced in the MBMS control channel MCCH. An additional MBMS indication channel MICH is provided for indicating a change in the MCCH control information.

In response to the reception of the Session Start message 604, the RNC 602 initiates an indication 608 in the MICH of a forthcoming modification of the control information provided in the MCCH. Subsequently the RNC 602 initiates the modification of the MCCH by newly providing the control information related to the content distribution 606. The MBMS Data Transfer message 610 basically indicates the transmission of data in the user-plane, i.e. the data transfer 606 on the MTCH. The data may be distributed using IP multicast between an MBMS gateway (not shown) and the RNC 602.

The Session Start message 604 also indicates the notification scheme to be applied for the announcement of the control information related to the forthcoming content distribution 606. The data transfer 606 comprises a file download (file delivery) for a push service, e.g. a Podcast service. For example, the file may be an AV file representing one episode of a TV series, which is regularly provided on a particular day in the week overnight. As typically the subscribers of the service are interested in receiving the entire file 606, it is not required that the file download 606 is announced in the MCCH during the entire transmission period of the file 606. For example, in the MBMS system, UES in Idle mode are configured to read the announcements on the MCCH as soon as new control information is added and triggered by indications on the MICH such as the indication 608. Thus, the service subscribers need the MCCH information only at the start of the actual data transmission 606.

Consequently, instead of a continuous announcement in the MCCH, the notification scheme prescribes as a temporal pattern for the provision (announcement) of control information in the MCCH a short time interval 612 and a further time interval 614. The first time interval 612 covers the time period from shortly before the start of the actual data transmission 606 until shortly after the beginning of the actual data transfer 606. In other words, the announcement of the file delivery stops shortly after the file download 606 has started.

There may be several situations, in which the UE of a subscriber of a file download service is not ready for reception of the file at the beginning of the data transfer. For example, a UE with limited capacity may be configured to receive only one MTCH at a time and will therefore not be able to receive the file download as long as another PTP connection or PTM data transfer is ongoing. In this case, the subscriber may be interested in receiving as much as possible of the data when the file download is still ongoing at the time the UE is ready for reception. However, after the end of the time interval 612, there is no announcement of the ongoing file download 606 on the MCCH. Therefore, the temporal pattern indicated in the Session Start message 604 provides the possibility to optionally place additional time intervals for control information provision in the MCCH, such as the time interval 614.

The announcement of control information during the time interval 614 may thus be triggered by the stop of another data transfer (e.g., for another PTM service or related to a PTP connection) into the cell served by the RNC 602. The length of the time interval 614 may be prescribed by the temporal pattern defined by notification scheme indicated in message 604. In other embodiments, the notification scheme might additionally or alternatively also comprise mandatory time intervals for rescheduling control information on the MCCH based on a time-out basis. For example, control information may be re-announced every five minutes on the MCCH.

As a further example, a subscriber may miss a part of a file download if the UE of the subscriber performs a handover into another cell shortly before or during the download. In some cases, the UE may start/continue the file download in the new cell in case the already received control information is relevant also for the new cell (soft combining, cell system frame number, SFN). In other cases, or in addition, the control node such as the RNC 602 in FIG. 6 may place a time interval such as interval 614 for providing the control information over the MCCH for the served cell and in particular for the UE now located therein. The placement of such a time interval may thus be triggered by a handover.

The above considerations may similarly hold for file download services including more complex content distribution schemes related to, e.g., the distribution of one or more files within several data transfer sessions. Mobile TV services, on the other hand, may generally require a continuous notification on the MCCH, as a user may activate the mobile TV reception at any time during the (continuous) streaming of the respective MBMS service.

It has been assumed above that the Session Start message 604 contains an indication of the notification scheme to be applied for the file download 606. In an alternative embodiment, a control node such as the RNC 602 may determine the applicable notification scheme from attributes contained within the Session Start message or, in general, one or more messages related to the file download. For example, these attributes may indicate that a file is provided for download in contrast to a continuous streaming. The control node may then select a notification scheme accordingly. In another embodiment, a message such as the Session Start message 604 may contain an explicit temporal pattern to be applied for the content distribution. For example, the placement and/or length of a time interval such as the time interval 612 may be explicitly indicated.

In the example discussed with reference to FIG. 6, it has been assumed that the entire control information is announced according to the notification scheme indicated in message 604. In other embodiments, the notification scheme may be applied to only a part of the control information, while another part is announced according to another notification scheme. For example, the notification scheme for file delivery services may be applied only to non-critical control information (such as Access information related to an MBMS service), while critical information in any case has to be continuously provided on the MCCH. In still another example, several notification schemes may be indicated to a control node such as the RNC 602, wherein each scheme is to be applied for a particular portion of the control information to be announced in the control channel.

Further with reference to an MBMS framework as illustrated in FIG. 6, it is noted that the stop of the announcement of control information over the MCCH at the end of the time interval 612 or 614 is not a Session Stop signal. Therefore the modification of the MCCH in this regard is not indicated on the MICH.

Some of the techniques described herein comprise that several notification schemes are available for providing control information over a control channel for content distributions. A particular of the notification schemes may then be adopted according to information related to the content distribution. In this way, the capacity of the control channel for providing control information for content distributions may be utilized more efficiently. For example, the number of services announced via the control channel may be increased.

The invention claimed is:

1. A method of controlling a content distribution in a point-to-multipoint ("PTM") enabled network environment, the method comprising:
   receiving information related to the content distribution;
   adopting, based on the information and for the content distribution, either a first control information notification scheme provided for a distribution of streaming content or a second control information notification scheme provided for a distribution of a content file;
   initiating a transmission of control information in accordance with the adopted notification scheme on the CCH; and
   providing control information related to the content distribution over a PTM control channel ("CCH") for recipients of the content distribution, the control information being provided over the CCH according to the adopted control information notification scheme indicating a temporal pattern for the provision of the control information,
   wherein according to the temporal pattern of the second notification scheme the control information is provided over the CCH in at least one time interval within the time span before and during the content distribution.

2. The method according to claim 1, wherein adopting the notification scheme comprises:
   selecting the notification scheme from a predefined plurality of notification schemes comprising at least the first and the second notification scheme.

3. The method according to claim 1, wherein the information related to the content distribution comprises an indication of the notification scheme to be selected.

4. The method according to claim 1, wherein the information related to the content distribution specifies at least partly the temporal pattern of the notification scheme to be adopted.

5. The method according to claim 1, wherein the information related to the content distribution comprises information related to at least one of a resource allocation for the content distribution and a time point for the start of the content distribution.

6. The method according to claim 1, wherein the temporal pattern of the first notification scheme comprises continuously providing the control information over the CCH within a time span before and during the content distribution.

7. The method according to claim 1, wherein the temporal pattern comprises periodic time intervals.

8. The method according to claim 1, wherein the second notification scheme provides that the control information on the CCH is triggered by a stop of another PTM content distribution or point-to-point (PTP) connection in the network environment.

9. The method according to claim 1, wherein the information related to the specific content distribution indicates a particular distribution scheme according to which the content is distributed.

10. The method according to claim 1, wherein a plurality of notification schemes are adopted and a first and second of the adopted notification schemes are applied to a first and second portion of the control information provided over the CCH, respectively.

11. The method according to claim 1, wherein the control information provided on the CCH comprises a request to the recipients to indicate an interest in reception of the content distribution.

12. The method according to claim 1, wherein the PTM-enabled network is a Universal Mobile Telecommunication System ("UMTS") or Long Term Evolution ("LTE") mobile network and the control channel is a Multimedia Broadcast and Multicast Service, MBMS, control channel.

13. The method according to claim 1, wherein the first notification scheme is adopted for at least one of Mobile TV services and mobile radio services and the second notification scheme is adopted for at least one of Podcast services, newsticker services and newsfeed services.

14. A method of controlling a content distribution in a point-to-multipoint ("PTM") enabled network environment, the method comprising:
   establishing a first control information notification scheme (CINS SC) for the distribution of streaming content;
   establishing a second control information notification scheme (CINS FD) for the distribution of one or more content files;
   determining information related to the content distribution;

sending the information related to the content distribution to enable adopting a proper one of the control information notification schemes for the specific content distribution; and providing control information related to the content distribution over a PTM control channel ("CCH") for recipients of the content distribution, the control information being provided over the CCH according to an adopted control information notification scheme indicating a temporal pattern for the provision of the control information, wherein according to the temporal pattern of the second notification scheme the control information is provided over the CCH in at least one time interval within the time span before and during the content distribution.

15. A control node configured to control content distribution in a point-to-multipoint ("PTM") enabled network environment, the control node comprising:

a reception component configured to receive information related to the content distribution;

a control information provisioning component configured to initiate, based on the information related to the specific content distribution and for the content distribution, either a first control information notification scheme provided for a distribution of streaming content or a second control information notification scheme provided for a distribution of a content file; and a transmission component configured to:
  initiate a transmission of control information in accordance with the adopted notification scheme on the CCH; and
  provide control information related to the content distribution over a PTM control channel ("CCH") for recipients of the content distribution, the control information being provided over the CCH according to the adopted notification scheme indicating a temporal pattern for the provision of the control information,
  wherein according to the temporal pattern of the second notification scheme the control information is provided over the CCH in at least one time interval within the time span before and during the content distribution.

16. The control node according to claim 15, wherein the control node is an Radio Network Controller ("RNC") or evolved Node B.

17. A control node configured to control a content distribution in a point-to-multipoint ("PTM") enabled network environment, the control node comprising:

a first provisioning component configured to establish a first control information notification scheme for the distribution of streaming content;

a second provisioning component configured to establish a second control information notification scheme for the distribution of one or more content flies;

a determination component configured to determine information related to the content distribution; and an interface component configured to:
  send the information related to the content distribution to enable adopting a proper one of the control information notification schemes for the specific content distribution; and
  provide control information related to the content distribution over a PTM control channel ("CCH") for recipients of the content distribution, the control information being provided over the CCH according to an adopted control information notification scheme indicating a temporal pattern for the provision of the control information,
  wherein according to the temporal pattern of the second notification scheme the control information is provided over the CCH in at least one time interval within the time span before and during the content distribution.

18. The control node according to claim 17, wherein the control node is a Broadcast Multicast Service Center, BM-SC.

* * * * *